United States Patent
Suwa et al.

(10) Patent No.: US 11,113,438 B2
(45) Date of Patent: Sep. 7, 2021

(54) FLUID SIMULATION PROGRAM, FLUID SIMULATION METHOD, AND FLUID SIMULATION DEVICE

(71) Applicant: FUJITSU LIMITED, Kawasaki (JP)

(72) Inventors: Tamon Suwa, Kawasaki (JP); Masaki Kazama, Kawasaki (JP)

(73) Assignee: FUJITSU LIMTIED, Kawasaki (JP)

( * ) Notice: Subject to any disclaimer, the term of this patent is extended or adjusted under 35 U.S.C. 154(b) by 496 days.

(21) Appl. No.: 16/151,447

(22) Filed: Oct. 4, 2018

(65) Prior Publication Data

US 2019/0108299 A1    Apr. 11, 2019

(30) Foreign Application Priority Data

Oct. 10, 2017    (JP) .............................. JP2017-197253

(51) Int. Cl.
| | |
|---|---|
| *G06F 30/23* | (2020.01) |
| *G06T 15/08* | (2011.01) |
| *G06T 13/60* | (2011.01) |
| *G06F 30/20* | (2020.01) |
| *G06F 111/10* | (2020.01) |

(52) U.S. Cl.
CPC .............. *G06F 30/23* (2020.01); *G06F 30/20* (2020.01); *G06T 13/60* (2013.01); *G06T 15/08* (2013.01); *G06F 2111/10* (2020.01); *G06T 2210/24* (2013.01)

(58) Field of Classification Search
CPC ...... G06F 30/23; G06F 30/20; G06F 2111/10; G06T 13/60; G06T 15/08; G06T 2210/24
See application file for complete search history.

(56) References Cited

U.S. PATENT DOCUMENTS

2016/0196373 A1    7/2016    Suwa

FOREIGN PATENT DOCUMENTS

| JP | 2010-243293 | 10/2010 |
| JP | 2016-125934 | 7/2016 |

OTHER PUBLICATIONS

Premoze et al., Particle-Based Simulation of Fluids, Eurographics 2003, pp. 401-410. (Year: 2003).*
J. J. Monaghan, "Smoothed Particle Hydrodynamics," Annual Reviews Astron. Astorphys, 30: pp. 543-574, 1992 (32 pages).
Mitsuteru Asai et al., "Slip and No-Slip Boundary Treatment for Particle Simulation Model with Incompatible Step-shaped Boundaries by Using a Virtual Maker," Transactions of JSCES, Paper No. 20130011, (May 8, 2013), with partial translation and English Abstract.

* cited by examiner

*Primary Examiner* — Haixia Du
(74) *Attorney, Agent, or Firm* — Fujitsu Patent Center

(57) ABSTRACT

A fluid simulating method includes extracting, based on positional information included in particle data of particles during a predetermined time period, a first particle with a predetermined value or less of distance from a fluid particle and a second particle with the predetermined value or less of distance from the first particle from among wall boundary particles related to a boundary with a wall. The method may also include setting a boundary condition of a pressure Poisson equation for calculating pressure to be applied to each of the particles, and calculating pressure to be applied to each of the particles, based on the extracted first particle and the extracted second particle. The method may also include calculating particle data of the particles during a next time period based on the calculated pressure.

6 Claims, 14 Drawing Sheets

FLUID SIMULATION PROGRAM, FLUID SIMULATION METHOD, AND FLUID SIMULATION DEVICE

CROSS-REFERENCE TO RELATED APPLICATION

This application is based upon and claims the benefit of priority of the prior Japanese Patent Application No. 2017-197253, filed on Oct. 10, 2017, the entire contents of which are incorporated herein by reference.

FIELD

The embodiment discussed herein is related to a fluid simulation program, a fluid simulation method, and a fluid simulation device.

BACKGROUND

Traditionally, as one of fluid analysis methods for numerically calculating a motion of a continuous body (hereinafter referred to as fluid) such as a fluid or an elastic body, there is a particle method for discretizing a continuous body as particles and representing the particles using a particle distribution. As the particle method, smoothed particle hydrodynamics (SPH), moving particle semi-implicit, or moving particle simulation (MPS) is known.

In the method for using a particle distribution to represent a target to be analyzed, a particle with a distance (h), called an influence radius, or less, from a certain particle is treated as a neighboring particle, and information of the neighboring particle is used. As an example, it is considered that the following Equation (1) as a motion equation of an uncompressed fluid in SPH is solved.

$$\frac{Dv}{Dt} = -\frac{1}{\rho}\nabla p + g \tag{1}$$

The left side of Equation (1) indicates the acceleration of a fluid element, the first term of the right side of Equation (1) is a pressure gradient term, and the second term of the right side of Equation (1) is an external force term. This is discretized using SPH. When $x_i$, $v_i$, $\rho_i$, $m_i$, and $p_i$ are a positional vector of a particle i, a velocity vector of the particle i, the density of the particle i, the mass of the particle i, and pressure to be applied to the particle i, calculation may be executed on time evolution according to the following Equations (2a) and (2b).

$$\begin{cases} v_i^{n+1} = v_i^n + \Delta t\left(g - \frac{1}{\rho_i}\langle\nabla p_i^{n+1}\rangle\right) & (2a) \\ x_i^{n+1} = x_i^n + \Delta t v_i^{n+1} & (2b) \end{cases}$$

In Equations (2a) and (2b), $\Delta t$ indicates time intervals of simulation, and a superscript n indicates the number of time steps. In addition, angled brackets < > indicate superposition evaluation by SPH and the superposition evaluation is expressed by the following Equation (3).

$$\langle \nabla p_i \rangle = \rho_i \sum_j m_j \left(\frac{p_j}{\rho_j^2} + \frac{p_i}{\rho_i^2}\right) \nabla W(r_{ij}, h) \tag{3}$$

In this case, an index j of the summation in Equation (3) is over indices of particles (neighboring particles) with the radius h or less from the particle i. Hereinafter, the same applies when the sum of superposition in SPH is calculated. W is a kernel function and is used to form a continuous field from a distribution of particles, and a cubic spline function expressed in the following Equation (4) or the like is used in many cases. $\beta$ is a normalization coefficient. When a target to be analyzed is a three-dimensional target, the normalization coefficient is $\pi h^3$.

$$W(r, h) = \begin{cases} \left(1 - 1.5\left(\frac{r}{h}\right)^2 + 0.75\left(\frac{r}{h}\right)^3\right)/\beta & 0 \le \frac{r}{h} < 1, \\ 0.25\left(2 - \frac{r}{h}\right)^3/\beta & 1 \le \frac{r}{h} < 2, \\ 0 & 2 \le \frac{r}{h} \end{cases} \tag{4}$$

Since the pressure $p_i$ to be applied to each particle is determined so that an incompressible condition $\nabla \cdot v_i = 0$ is satisfied, the pressure $p_i$ is calculated by implicitly solving a pressure Poisson equation or Equation (5).

$$\langle \nabla^2 p_i^{n+1} \rangle = \frac{\rho_0}{\Delta t} \langle \nabla \cdot v_i^* \rangle \tag{5}$$

In Equation (5), $\rho_0$ is a standard density of a substance, $v_i^*$ is an intermediate velocity updated by the external force term and is expressed according to the following Equation (6).

$$v_i^* = v_i^n + \Delta t g \tag{6}$$

The left side of Equation (5) is pressure Laplacian and is discretized by the following Equation (7).

$$\langle \nabla^2 p_i \rangle = \frac{2}{\rho_i} \sum_j \left\{ m_j \left(\frac{r_{ij} \nabla W(r_{ij}, h)}{r_{ij}^2 + \eta^2}\right)(p_i - p_j) \right\} \tag{7}$$

In addition, velocity divergence indicated by the right side of Equation (5) is discretized by the following Equation (8).

$$\langle \nabla \cdot v_i^* \rangle = \frac{1}{\rho_i} \sum_j m_j (v_j^* - v_i^*) \cdot \nabla W(r_{ij}, h) \tag{8}$$

By executing the discretization in this manner, Equation (7), which is a pressure Poisson equation, may be expressed as the following Equations (9) and (10) and results in the following linear Equation (11).

$$A_{ij} = \begin{cases} \frac{2}{\rho_i} m_j \left(\frac{x_{ij} \nabla W_{ij}}{x_{ij}^2 + \eta^2}\right) & (i \ne j) \\ \frac{2}{\rho_i} \sum_k m_k \left(\frac{x_{ik} \nabla W_{ik}}{x_{ik}^2 + \eta^2}\right) & (i = j) \end{cases} \tag{9}$$

$$b_i = \frac{\rho_0}{\Delta t} \langle \nabla \cdot v_i^* \rangle \tag{10}$$

$$A_{ij} p_j = b_i \tag{11}$$

When a sufficient amount of particles do not exist near a certain particle, the aforementioned pressure Poisson equation treats the certain particle as a free surface, defines 0 as pressure to be applied to the particle treated as the free surface, gives an appropriate boundary condition, and may be solved by an iteration method such as a conjugate gradient method.

Examples of related art are Japanese Laid-open Patent Publication No. 2010-243293 and Japanese Laid-open Patent Publication No. 2016-125934.

Other examples of related art are J. J Monaghan, "Smoothed Particle Hydrodynamics", Annu, Rev. Astron. Astrophys. 30: 543-74 (1992) and Mitsuteru Asai, Keisuke Fujimoto, Shoichi Tanabe, Masuhiro Beppu, "Slip and Non-Slip Boundary Treatment for Particle Simulation Model with Incompatible Step-Shaped Boundaries by Using a Virtual Marker" Transactions of JSCES, Paper No. 20130011, 2013.

In the aforementioned technique, however, when an appropriate boundary condition is not set due to the flow of a fluid in a thin gap, a solution may not be uniquely specified, and a failure such as pressure divergence may occur. For example, when a fluid flows into a thin gap, neighboring particles exist for all fluid particles, a particle to be determined as a free surface in the thin gap does not exist, and an appropriate boundary condition is not set.

According to an aspect, an object of the present disclosure is to provide a fluid simulation program, a fluid simulation method, and a fluid simulation device that may secure convergence of a solution in a particle method.

SUMMARY

According to an aspect of the embodiments, a fluid simulating method includes: extracting, based on positional information included in particle data of particles during a predetermined time period, a first particle with a predetermined value or less of distance from a fluid particle and a second particle with the predetermined value or less of distance from the first particle from among wall boundary particles related to a boundary with a wall; setting a boundary condition of a pressure Poisson equation for calculating pressure to be applied to each of the particles, and calculating pressure to be applied to each of the particles, based on the extracted first particle and the extracted second particle; and calculating particle data of the particles during a next time period based on the calculated pressure.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, a fluid simulation program, fluid simulation method, and fluid simulation device according to an embodiment are described with reference to the accompanying drawings. In the embodiment, configurations that have the same function are indicated by the same reference symbol, and a duplicated description is omitted. The fluid simulation program, the fluid simulation method, and the fluid simulation device, which are described in the embodiment, are examples and do not limit the embodiment. Two or more of configurations described in the embodiment and two or more of processes described in the embodiment may be combined without contradiction.

Figure 1:
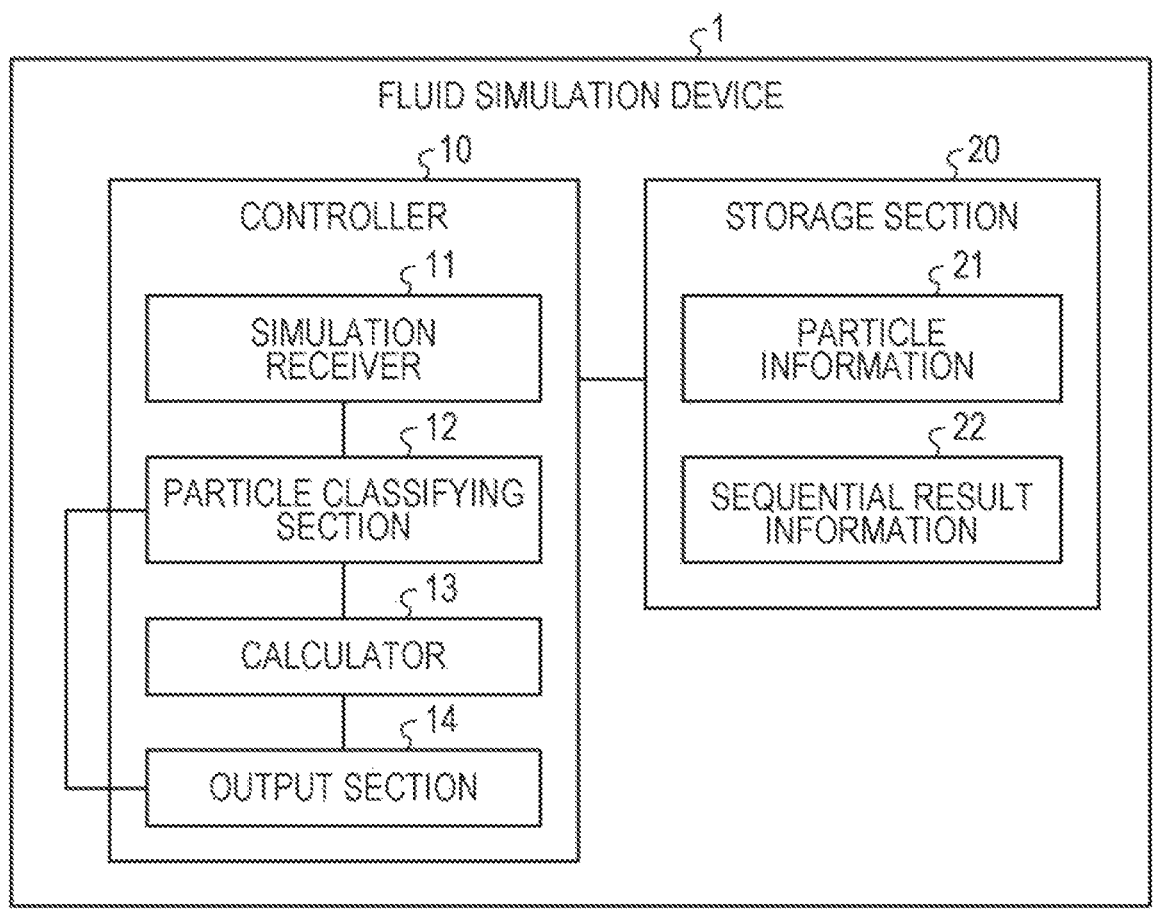
FIG. 1 is a functional block diagram illustrating an example of a configuration of a fluid simulation device according to an embodiment.

FIG. 1 is a functional block diagram illustrating an example of a configuration of the fluid simulation device according to the embodiment. As illustrated in FIG. 1, the fluid simulation device 1 is an information processing device that is configured to execute fluid simulation by a particle method and is a workstation or the like. The fluid simulation device 1 includes a controller 10 and a storage section 20.

The controller 10 corresponds to an electronic circuit such as a central processing unit (CPU). The controller 10 includes an internal memory for storing control data and a program defining various process procedures and executes various processes using the program and the control data. The controller 10 includes a simulation receiver 11, a particle classifying section 12, a calculator 13, and an output section 14.

The storage section 20 is a storage device such as a semiconductor memory element such as a random access memory (RAM) or a flash memory, a hard disk, or an optical disc. The storage section 20 includes particle information 21 and sequential result information 22.

The particle information 21 is data input as setting conditions of the fluid simulation and is mainly information of particles to be subjected to the fluid simulation. The input data, which is the particle information 21, includes, for example, calculation parameters and particle data of particles of three types.

The calculation parameters indicate property values of a fluid to be subjected to the simulation, a simulation environment, and the like. For example, the calculation parameters include an influence radius within which each of the particles has an influence, external force vectors applied to the particles, time intervals of the simulation, a standard density of a substance to be subjected to the simulation, the mass of a single particle, a divide-by-zero prevention parameter $\eta$, and the like.

Figure 2A:
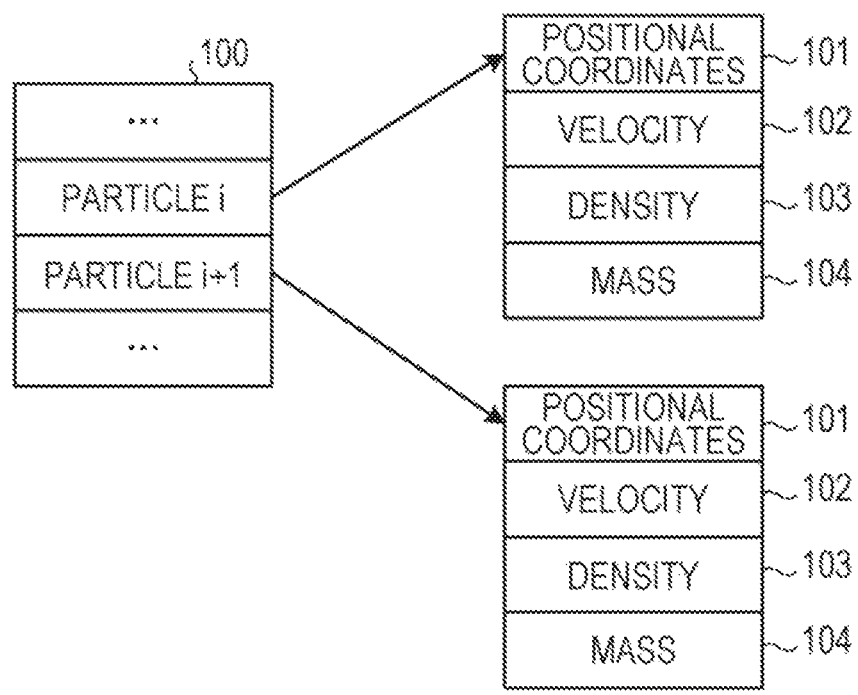
FIG. 2A is an explanatory diagram illustrating an example of input data of free fluid particles.
Figure 2B:
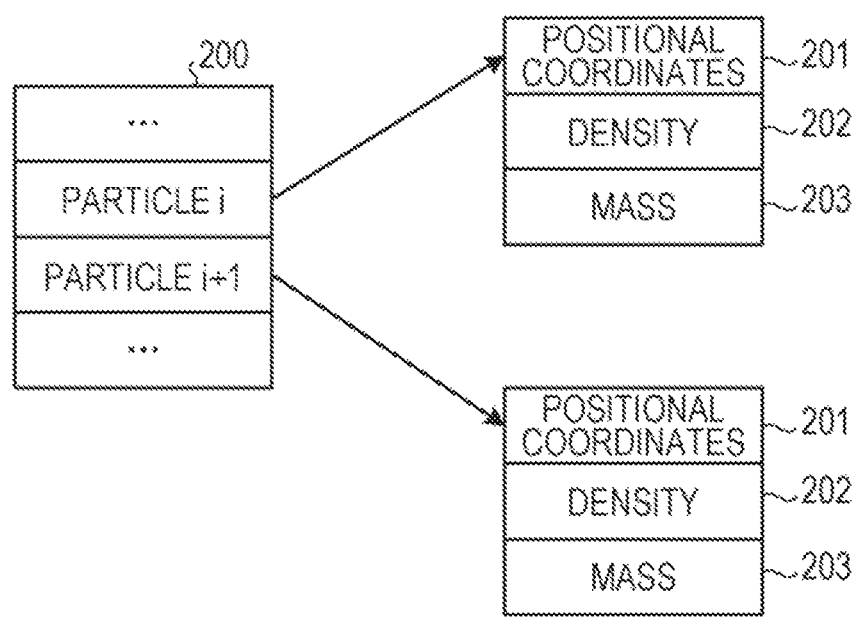
FIG. 2B is an explanatory diagram illustrating an example of input data of wall boundary particles.
Figure 2C:
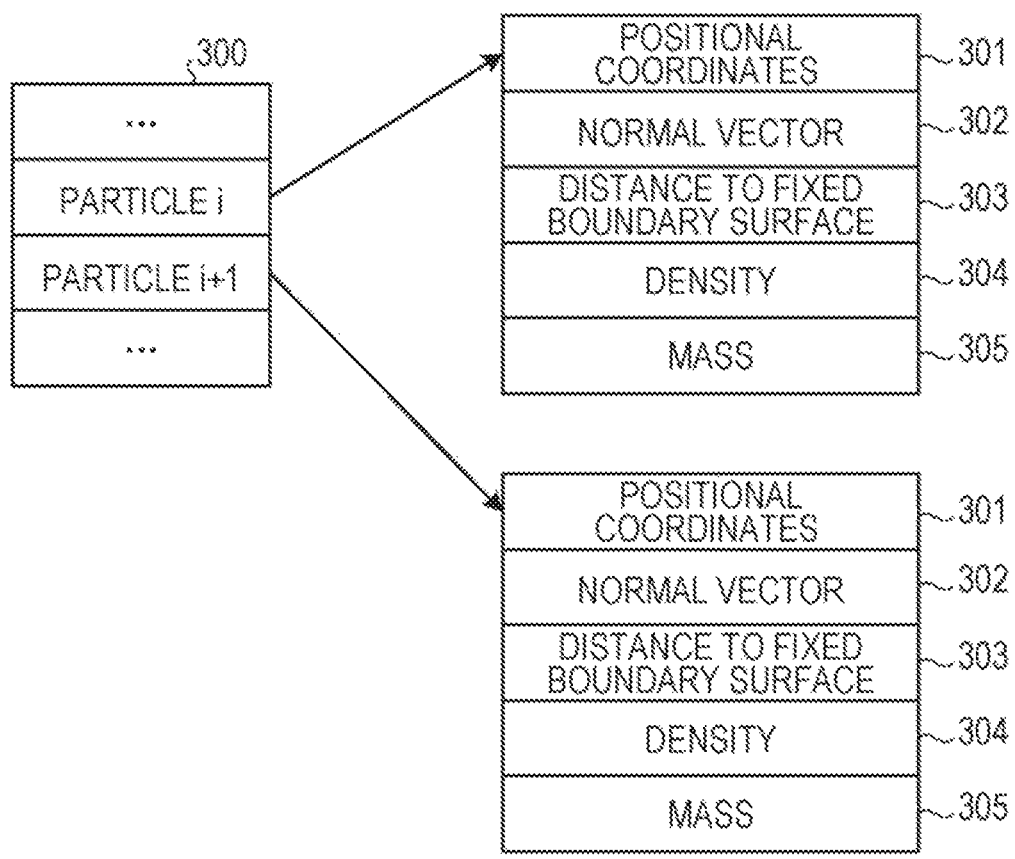
FIG. 2C is an explanatory diagram illustrating an example of input data of wall internal particles.

The particle data includes three types of particles, free fluid particles, wall boundary particles, and wall internal particles. FIG. 2A is an explanatory diagram illustrating an example of input data of the free fluid particles. FIG. 2B is an explanatory diagram illustrating an example of input data of the wall boundary particles. FIG. 2C is an explanatory diagram illustrating an example of input data of the wall internal particles.

The free fluid particles are a fluid to be analyzed in the simulation. Specifically, the free fluid particles are an example of fluid particles. As illustrated in FIG. 2A, free fluid particle input data 100 on the free fluid particles includes positional coordinates 101 of the particles (i, i+1, . . . ), velocities 102 of the particles (i, i+1, . . . ), densities 103 of the particles (i, i+1, . . . ), and masses 104 of the particles (i, i+1, . . . ). The positional coordinates 101 and the velocities 102 are updated to positional coordinates and velocities calculated for each of time steps. The input data 100 indicates initial values of the positional coordinates 101 and initial values of the velocities 102.

The wall boundary particles are positioned on fixed boundary surfaces that inhibit the free fluid particles from moving. The wall boundary particles are particles for representing a boundary condition of a pressure Poisson equation. As illustrated in FIG. 2B, wall boundary particle input data 200 on the wall boundary particles includes positional coordinates 201 of the particles (i, i+1, . . . ), densities 202 of the particles (i, i+1, . . . ), and masses 203 of the particles (i, i+1, . . . ).

The wall internal particles are positioned in fixed boundaries and used upon the calculation of velocity divergence and pressure gradients. As illustrated in FIG. 2C, wall internal particle input data 300 on the wall internal particles includes positional coordinates 301 of the particles (i, i+1, . . . ), normal vectors 302 of the particles (i, i+1, . . . ), distances 303 from the particles (i, i+1, . . . ) to the fixed boundary surfaces, densities 304 of the particles (i, i+1, . . . ), and masses 305 of the particles (i, i+1, . . . ). As the densities and masses of the particles, values included in the calculation parameters may be used.

Figure 3A:
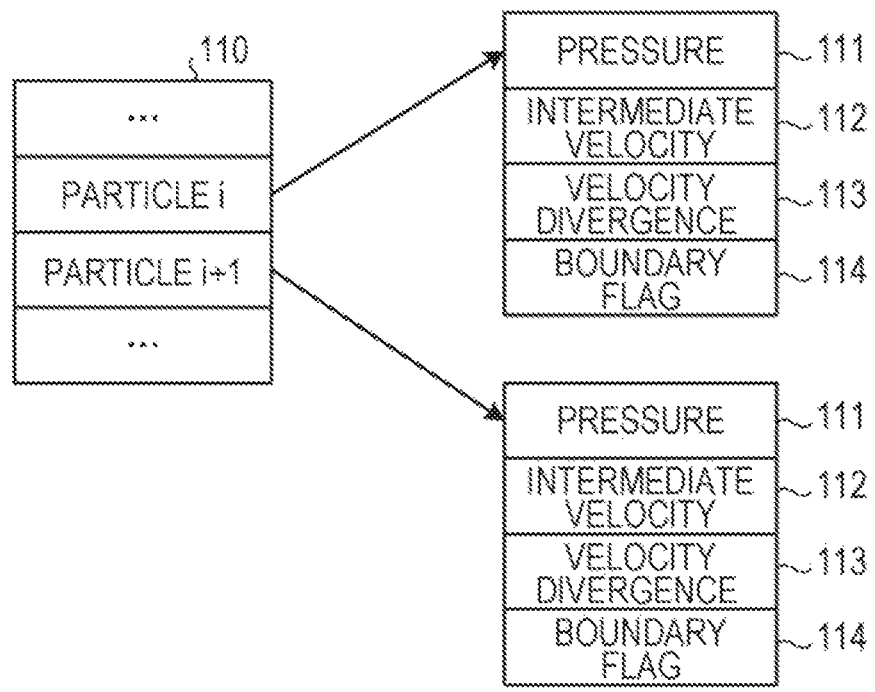
FIG. 3A is an explanatory diagram illustrating an example of intermediate data of free fluid particles.
Figure 3B:
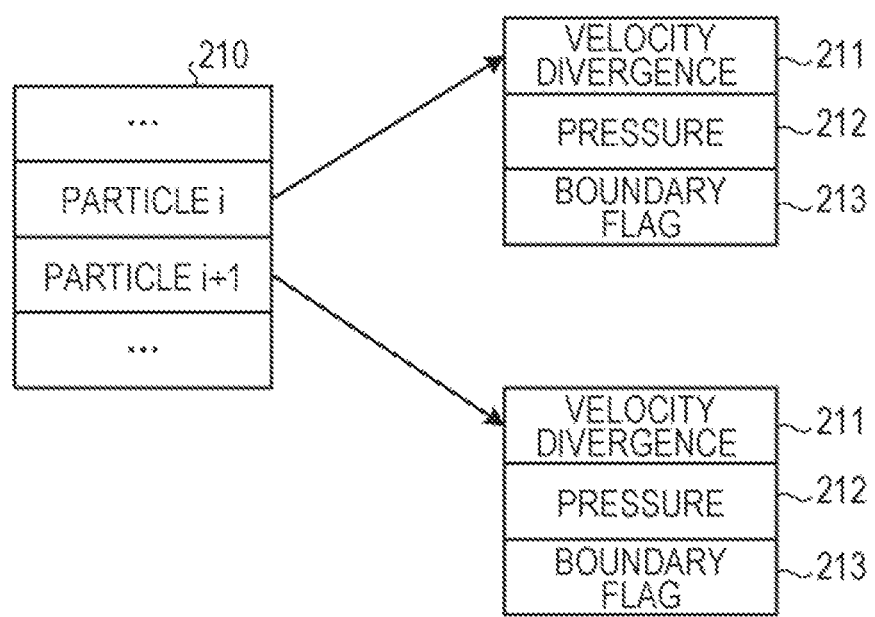
FIG. 3B is an explanatory diagram illustrating an example of intermediate data of wall boundary particles.
Figure 3C:
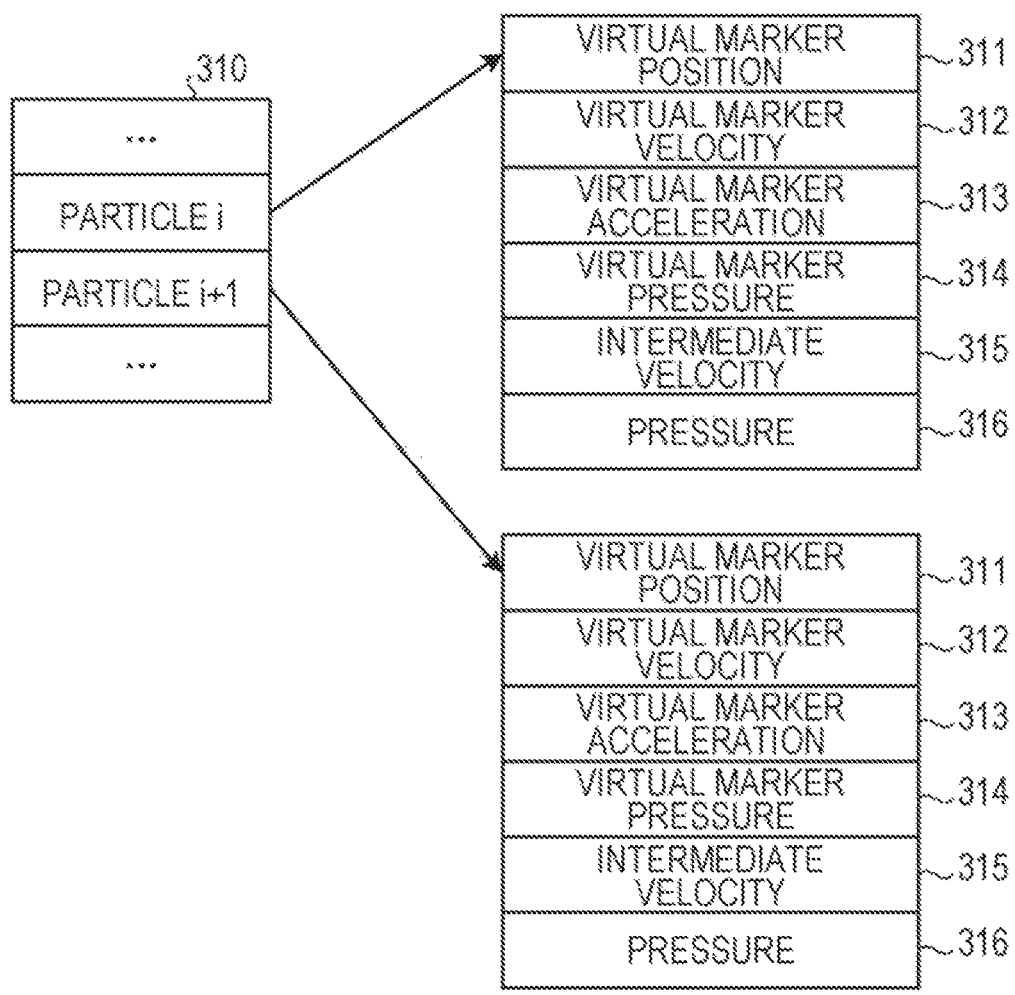
FIG. 3C is an explanatory diagram illustrating an example of intermediate data of wall internal particles.

The sequential result information 22 is intermediate data indicating results of simulating the particles for each of the time steps. FIG. 3A is an explanatory diagram indicating an example of intermediate data of the free fluid particles. FIG. 3B is an explanatory diagram illustrating an example of intermediate data of the wall boundary particles. FIG. 3C is an explanatory diagram illustrating an example of intermediate data of the wall internal particles.

As illustrated in FIG. 3A, free fluid particle intermediate data 110 on the free fluid particles includes pressure 111 to be applied to the particles (i, i+1, . . . ), intermediate velocities 112 of the particles (i, i+1, . . . ), velocity divergence 113 of the particles (i, i+1, . . . ), and boundary flags 114 of the particles (i, i+1, . . . ). Each of the boundary flags 114 indicates a classification of an internal particle or surface particle for each of the free fluid particles.

As illustrated in FIG. 3B, wall boundary particle intermediate data 210 on the wall boundary particles includes velocity divergence 211 of the particles (i, i+1, . . . ), pressure 212 to be applied to the particles (i, i+1, . . . ), and boundary flags 213 of the particles (i, i+1, . . . ). Each of the boundary flags 213 indicates a classification of a fixed fluid particle, pressure boundary particle, or unused particle for each of the wall boundary particles.

As illustrated in FIG. 3C, wall internal particle intermediate data 310 on the wall internal particles includes virtual marker positions 311 of the particles (i, i+1, . . . ), virtual marker velocities 312 of the particles (i, i+1, . . . ), virtual marker acceleration 313 of the particles (i, i+1, . . . ), virtual marker pressure 314 of the particles (i, i+1, . . . ), intermediate velocities 315 of the particles (i, i+1, . . . ), and pressure 316 to be applied to the particles (i, i+1, . . . ). The virtual marker positions 311 are mirror image positions with respect to the fixed boundary surfaces of the wall internal particles. The virtual marker velocities 312, the virtual marker acceleration 313, and the virtual marker pressure 314 are virtual values of velocities, acceleration, and pressure at the mirror image positions.

Referring to FIG. 1, the simulation receiver 11 receives a request to execute the fluid simulation. For example, the simulation receiver 11 receives the execution request including the particle information 21 including the calculation parameters, the free fluid particle input data 100, the wall boundary particle input data 200, and the wall internal particle input data 300. The simulation receiver 11 causes the received particle information 21 to be stored in the storage section 20 and starts a process of the fluid simulation, which is to be executed by the simulation receiver 11, the particle classifying section 12, and the output section 14.

The particle classifying section 12 classifies, for each of the time steps corresponding to the time intervals of the calculation parameters, the particles based on positional information (positional coordinates 101, 201, and 301) of the particles that is included in the particle information 21. Specifically, the particle classifying section 12 classifies the free fluid particles into surface particles and internal particles. In addition, the particle classifying section 12 classifies the wall boundary particles into fixed fluid particles, pressure boundary particles, and unused particles.

The calculator 13 sets, based on the results of classifying the particles by the particles classifying section 12, the boundary condition of the pressure Poisson equation for calculating pressure to be applied to each of the particles and calculates pressure to be applied to each of the particles. Specifically, the calculator 13 sets the particles classified (extracted) as the fixed fluid particles from the wall boundary particles to fluid particles whose velocities are fixed to a predetermined value, and the calculator 13 causes the set fixed fluid particles to be included in degrees of freedom that are used when the pressure Poisson equation is solved. In addition, the calculator 13 sets the boundary condition in which pressure to be applied to each of the particles classified (extracted) as the pressure boundary particles from the wall boundary particles is 0. The calculator 13 uses the pressure Poisson equation to calculate pressure to be applied to each of the particles in the set boundary condition. The calculator 13 calculates particle data (for example, velocities and positions) of the particles for the next time step based on the calculated pressure.

The output section 14 outputs the results of the calculation by the calculator 13. Specifically, the output section 14 causes the results of the calculation executed for each of the time steps to be stored as the sequential result information 22 in the storage section 20. The output section 14 may output simulation results based on the sequential result information 22 calculated for each of the time steps from the start to end of the simulation to a display device such as a display to display the simulation results or may output the simulation results in the form of a file to the display device.

Figure 4:
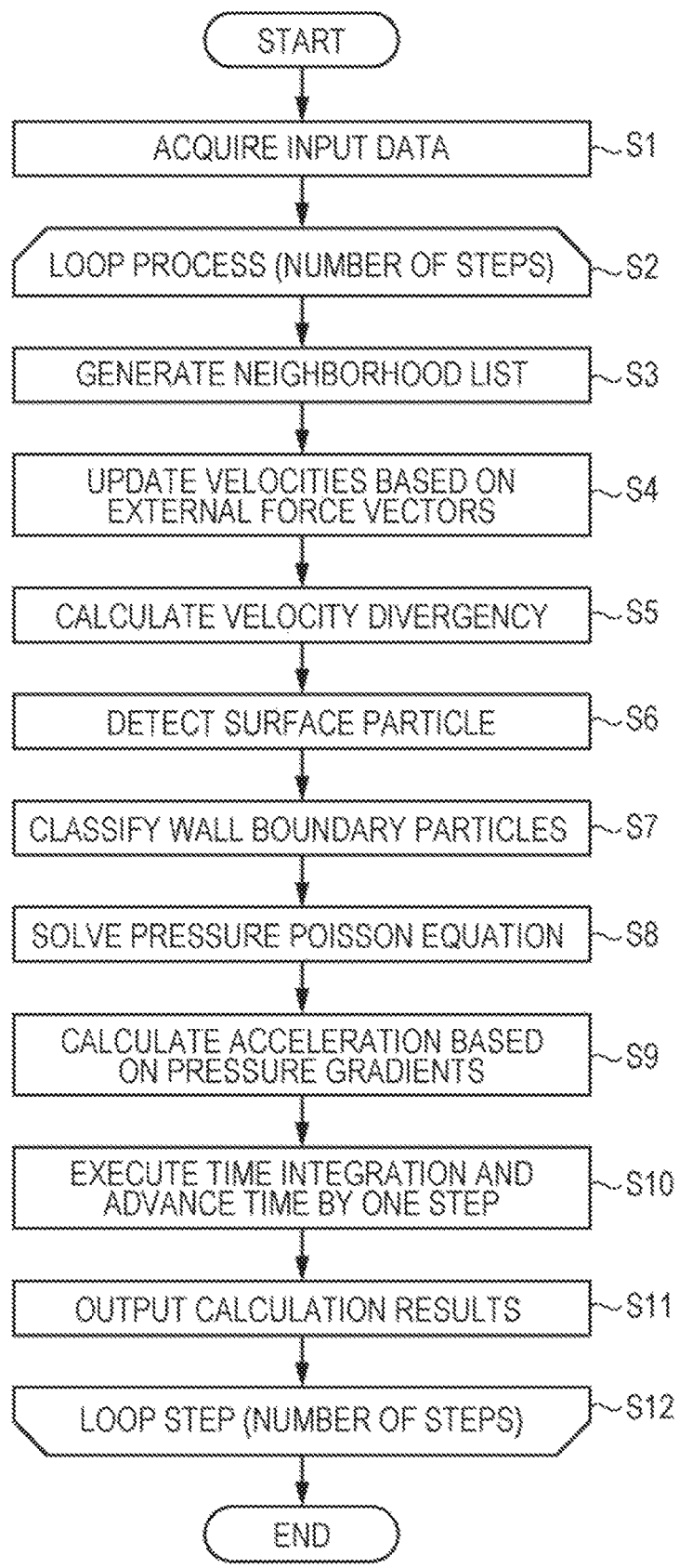
FIG. 4 is a flowchart illustrating an example of operations of the fluid simulation device according to the embodiment.

Details of the process of the fluid simulation to be executed in the fluid simulation device 1 are described below in detail. FIG. 4 is a flowchart illustrating an example of operations of the fluid simulation device 1 according to the embodiment.

As illustrated in FIG. 4 and with reference to FIG. 1, when the process is started, the simulation receiver 11 of the fluid simulation device 1 acquires the input data on the particle information 21 via an input operation by a user or the like (in S1).

The particle classifying section 12, calculator 13, and output section 14 of the fluid simulation device 1 reference the particle information 21 and the sequential result information 22 and execute a loop process (S2 to S12) for the number of steps (time steps) corresponding to end time of the simulation.

After S2, the particle classifying section 12 generates a neighborhood list of particles neighboring each of the particles based on the positional information (positional coordinates 101, 201, and 301) included in the particle information 21 (in S3). Specifically, the particle classifying section 12 extracts particles with the influence radius included in the calculation parameters or less from the position of each of the particles and generates, for each of the particles, a neighborhood list of particle numbers identifying neighboring particles.

Figure 5:
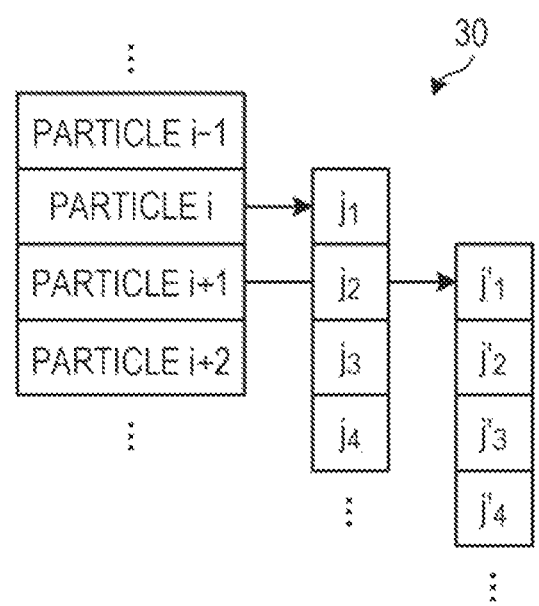
FIG. 5 is an explanatory diagram illustrating an example of a neighborhood list.

FIG. 5 is an explanatory diagram illustrating an example of the neighborhood lists. As illustrated in FIG. 5, in a neighborhood list 30, neighboring particles with the influence radius or less from each of particles (i−1, i, i+1, i+2, . . . ) are arranged. For example, for the particle (i), particles (j$_1$, j$_2$, . . . ) are listed as neighboring particles of the particle (i). In addition, for the particle (i+1), particles (j'$_1$, j'$_2$, . . . ) are listed neighboring particles of the particle (i+1).

Referring back to FIG. 4, the calculator 13 updates velocities ($v_i^n$) (according to Equation (6)) of the free fluid particles based on external force vectors (g) and the time intervals (Δt) and calculates intermediate velocities ($v_i^*$) (in S4).

The calculator 13 calculates velocity divergence for the free fluid particles (in S5). This calculation is executed in order from the evaluation of velocities at the virtual marker positions 311, the evaluation of velocities of the wall internal particles, and the calculation of the velocity divergence.

Specifically, the calculator 13 calculates the virtual marker positions 311 as mirror image positions with respect to the fixed boundary surfaces of the wall internal particles. For example, a virtual marker position 311 of a certain wall internal particle is calculated according to the following Equation (12) using positional coordinates 301 of the particle, a normal vector 302 of the particle, and a distance 303 from the particle to a fixed boundary surface.

$$x_i^{VM} = x_i + dn \quad (12)$$

A velocity (virtual marker velocity 312) at this virtual marker position 311 is evaluated according to the following Equation (13). In this case, a range of the summation corresponds to a range of neighboring particles of a free fluid particle.

$$v_i^{VM} = \sum_j \frac{m_j}{\rho_{0j}} v_j W_{ij} \Big/ \sum_j \frac{m_j}{\rho_{0j}} W_{ij} \quad (13)$$

The calculator 13 calculates the intermediate velocities 315 of the wall internal particles as $v_i^* = v_i^{VM}$ from the virtual marker velocities 312 at the virtual marker positions 311. This corresponds to the fact that a non-slip condition is imposed for the fixed boundary surfaces.

The calculator 13 uses Equation (8) to calculate velocity divergence for each of the free fluid particles. In this case, a range of the summation corresponds to a range of neighboring particles of the free fluid particles and wall internal particles.

The particle classifying section 12 detects (extracts) particles to be treated as surface particles from the free fluid particles (in S6). Specifically, upon paying attention to a certain particle, the particle classifying section 12 treats the certain particle as a surface particle when a neighboring particle (particle, indicated in a neighboring list 30, with a distance smaller than the influence radius from the certain particle) of the certain particle does not exist in any of directions. In addition, when neighboring particles of the certain particle exist in all the directions, the particle classifying section 12 treats the certain particle as an internal particle.

Figure 6A:
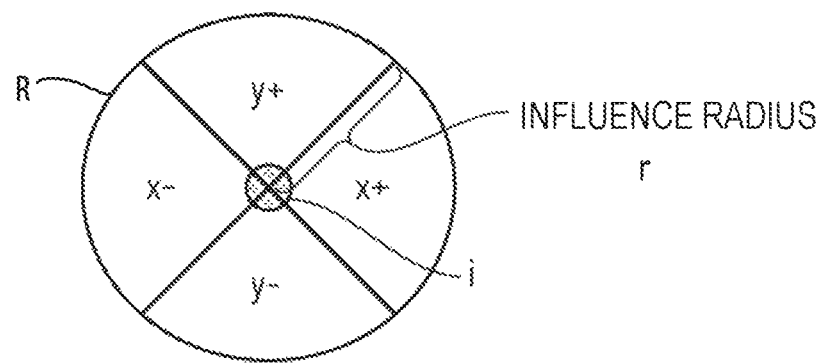
FIG. 6A is an explanatory diagram describing the classification of spatial regions indicating neighborhoods of a particle.

FIG. 6A is an explanatory diagram describing the classification of spatial regions indicating neighborhoods of a particle.

As illustrated in FIG. 6A, a two-dimensional spatial region is described as an example. First, a concerned particle (i) is treated as the center of a spatial region within the influence radius (r), and the spatial region R is classified into four regions x+, x−, y+, and y−. The particle classifying section 12 determines whether or not a particle with the influence radius or less from the concerned particle (i) belongs any of the spatial regions. When a spatial region that is among the four spatial regions and to which any particle does not belong exists, the particle classifying section 12 extracts the particle (i) as a surface particle.

Figure 6B:
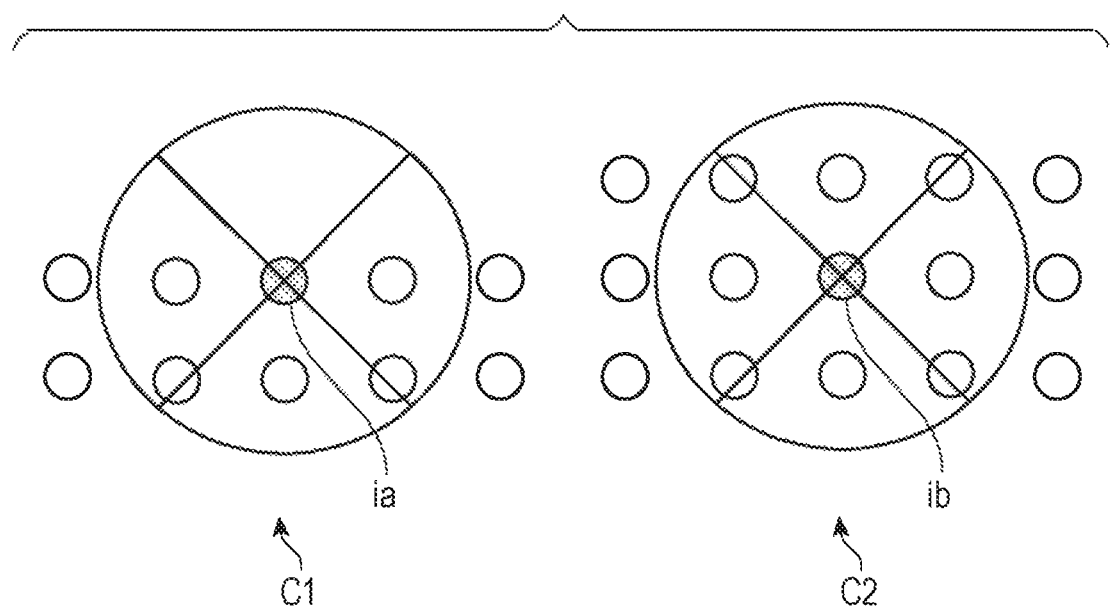
FIG. 6B is an explanatory diagram describing an example of the extraction of surface particles and internal particles.

As illustrated in FIG. 6B, in case C1, since a neighboring particle does not exist in the region y+, a central particle (ia) is extracted as a surface particle. On the other hand, in case C2, since neighboring particles exist in all the regions, a central particle (ib) is extracted as an internal particle. The particle classifying section 12 causes results of the determination as results of classification to be stored in boundary flags 114 of the free fluid particle intermediate data 110.

Referring again to FIG. 4, the particle classifying section 12 executes a process of classifying the particles based on the positional coordinates 101, 201, and 301 included in the particle information 21, thereby classifying the wall boundary particles into fixed fluid particles, pressure boundary particles, and unused particles (in S7).

Figure 7A:
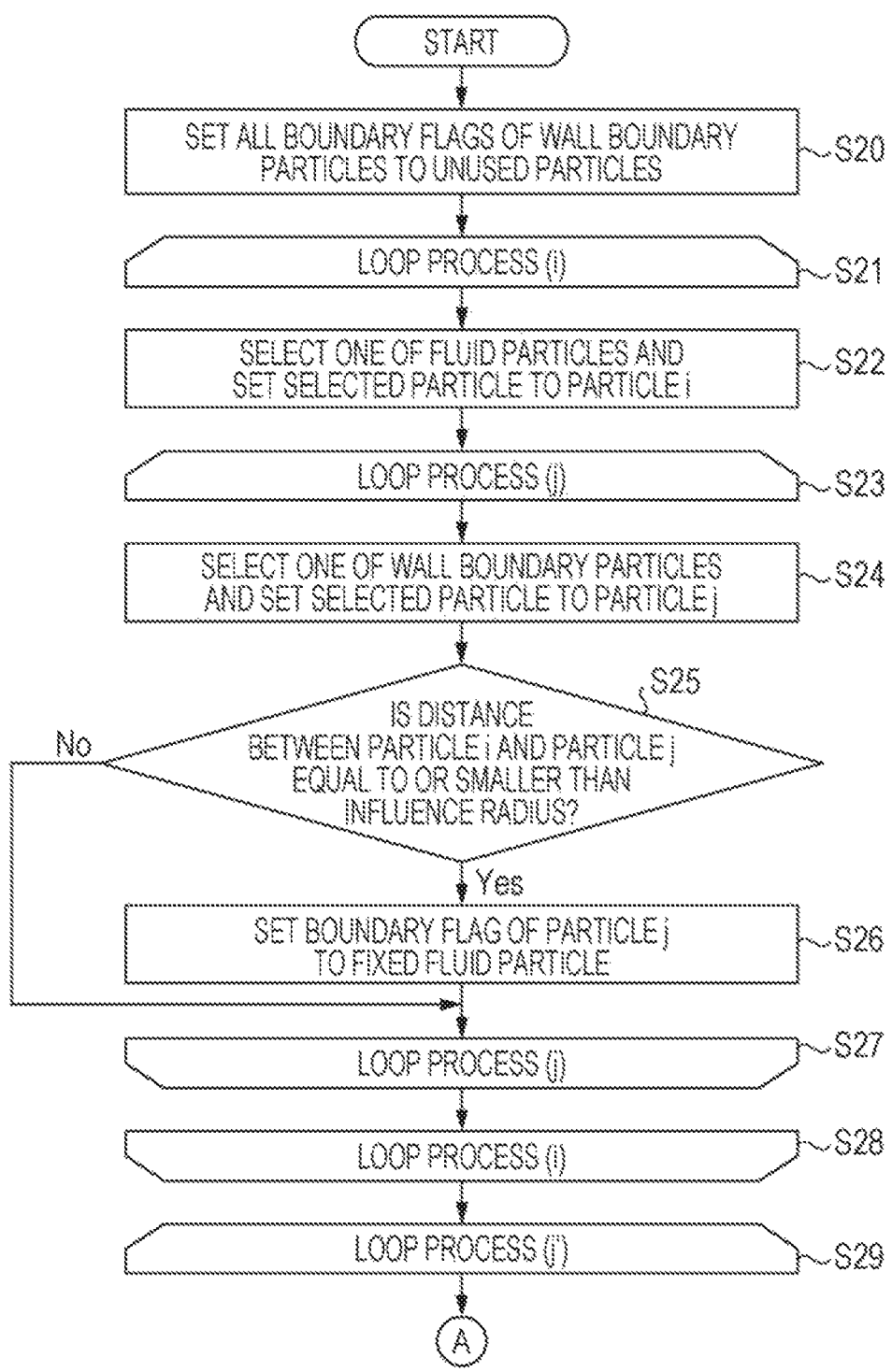
FIGS. 7A and 7B are a flowchart exemplifying a process of classifying particles.
Figure 7B:
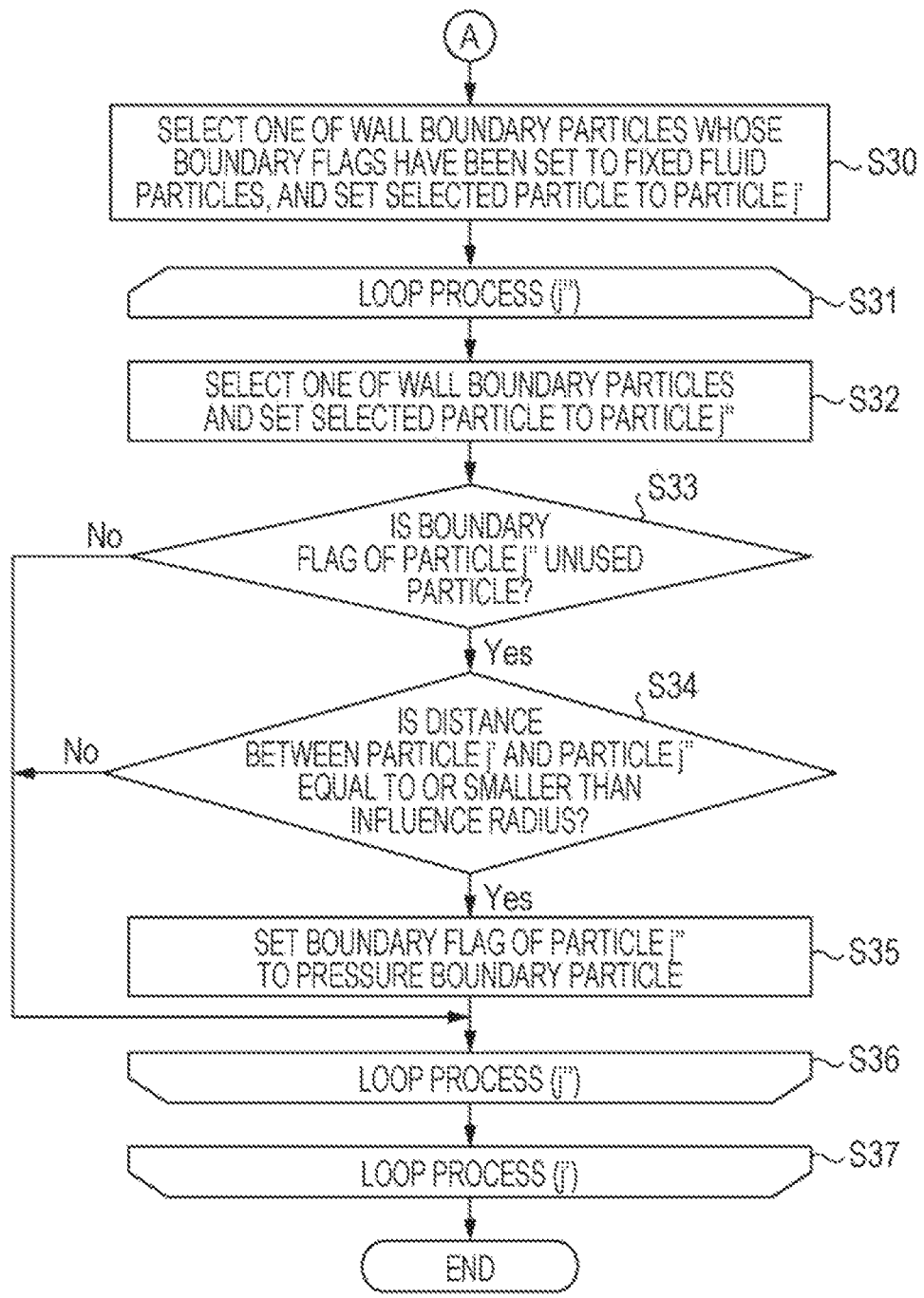

FIGS. 7A and 7B are a flowchart exemplifying the process of classifying particles. As illustrated in FIGS. 7A and 7B, when the process of classifying particles is started, the particle classifying section 12 sets each of boundary flags 213 of all wall boundary particles to an unused particle (in S20).

The particle classifying section 12 executes a loop process (i) on each of the free fluid particles (in S21 to S28). When the loop process (i) is started, the particle classifying section 12 selects one of the free fluid particles and sets the selected free fluid particle to a particle i (in S22).

The particle classifying section 12 executes a loop process (j) on each of the wall boundary particles (in S23 to S27). When the loop process (j) is started, the particle classifying section 12 selects one of the wall boundary particles and sets the selected wall boundary particle to a particle j (in S24).

The particle classifying section 12 uses positional coordinates 101 of the particle i and positional coordinates 201 of the particle j to calculate a distance (r) between the particle i and the particle j and determines whether or not the distance between the particle i and the particle j is equal to or smaller than the influence radius (in S25).

When the distance is equal to or smaller than the influence radius (YES in S25), the particle classifying section 12 sets a boundary flag 213 of the particle j to a fixed fluid particle (in S26). When the distance is larger than the influence radius (NO in S25), the particle classifying section 12 skips S26 and maintains the boundary flag 213.

When an unselected wall boundary particle exists, the particle classifying section 12 sets the particle to a particle j and repeats the loop process (j). In addition, after the loop process (j), when an unselected free fluid particle exists, the particle classifying section 12 sets the particle to a particle i and repeats the loop process (i).

The particle classifying section 12 executes a loop process (j') on each of fixed fluid particles (in S29 to S37). When the loop process (j') is started, the particle classifying section 12 selects one of wall boundary particles whose boundary flags 213 have been set to fixed fluid particles, and sets the selected wall boundary particle to a particle j' (in S30).

The particle classifying section 12 executes a loop process (j") on each of the wall boundary particles (in S31 to S36). When the loop process (j") is started, the particle classifying section 12 selects one of the wall boundary particles and sets the selected wall boundary particle to a particle j" (in S32).

The particle classifying section 12 determines whether or not a boundary flag 213 of the particle j" indicates an unused particle (in S33). When the boundary flag 213 does not indicate the unused particle (NO in S33), the particle classifying section 12 skips S34 and S35 to cause the process to proceed to S36 to execute a loop process of selecting the next particle j".

When the boundary flag 213 indicates the unused particle (YES in S33), the particle classifying section 12 uses positional coordinates 201 of the particles j' and j" to calculate a distance between the particle j' and the particle j" and determines whether or not the distance between the particle j' and the particle j" is equal to or smaller than the influence radius (in S34).

When the distance between the particle j' and the particle j" is equal to or smaller than the influence radius (YES in S34), the particle classifying section 12 sets a boundary flag 213 of the particle j" to a pressure boundary particle (in S35). When the distance between the particle j' and the particle j" is larger than the influence radius (NO in S34), the particle classifying section 12 skips S35 and maintains the boundary flag 213.

When an unselected wall boundary particle exists, the particle classifying section 12 sets the particle to a particle j" and repeats the loop process (j"). In addition, after the loop process (j"), when an unselected fixed fluid particle exists, the particle classifying section 12 sets the particle to a particle j' and repeats the loop process (j').

Figure 8:
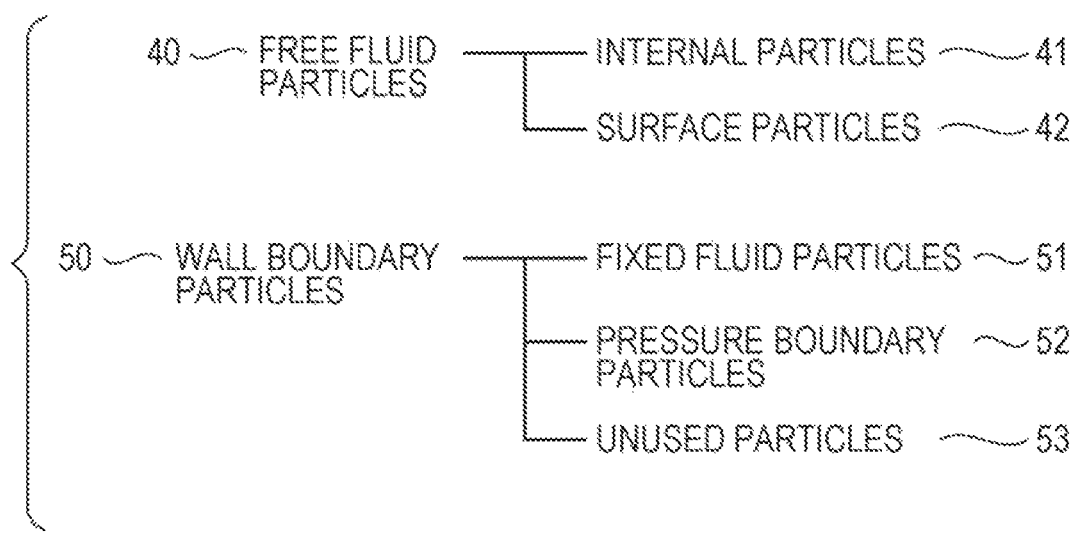
FIG. 8 is an explanatory diagram describing the classification of particles.

FIG. 8 is an explanatory diagram describing the classification of particles. As illustrated in FIG. 8, free fluid particles 40 are classified into internal particles 41 and surface particles 42 by the process of S6. In addition, wall boundary particles 50 are classified into fixed fluid particles 51, pressure boundary particles 52, and unused particles 53 by the classification process of S7.

Returning to FIG. 4, processes S8-S12 are described. Since the unused particles 53 are not used until the termination of this step, the unused particles 53 are ignored after S7. Sequential numbers are assigned to the free fluid particles 40, the fixed fluid particles 51, the pressure boundary particles 52, and the like, and particles i, j, and the like are referenced using the sequential numbers. In addition, the calculator 13 sets, to 0, pressure 212 and velocity divergence 211 of the fixed fluid particles 51 and pressure boundary particles 52.

The calculator 13 calculates pressure to be applied to each of the particles by solving the linear Equation (11) as a pressure Poisson equation for calculating pressure to be applied to each of the particles (in S8).

Specifically, the calculator 13 prepares a coefficient matrix A and a right side vector b as work data. The coefficient matrix A is sufficient as long as the number of real values is the square of the number of particles and the real values are stored in the coefficient matrix A. However, since most of the values are 0, compressed sparse row (CSR) or the like may be used to efficiently store only nonzero elements. The right side vector b is secured as an array for storing real values whose number is equal to the number of particles. The calculator 13 executes a process of solving the matrix equation (Equation (11)) for the coefficient matrix A and the right side vector b.

Figure 9:
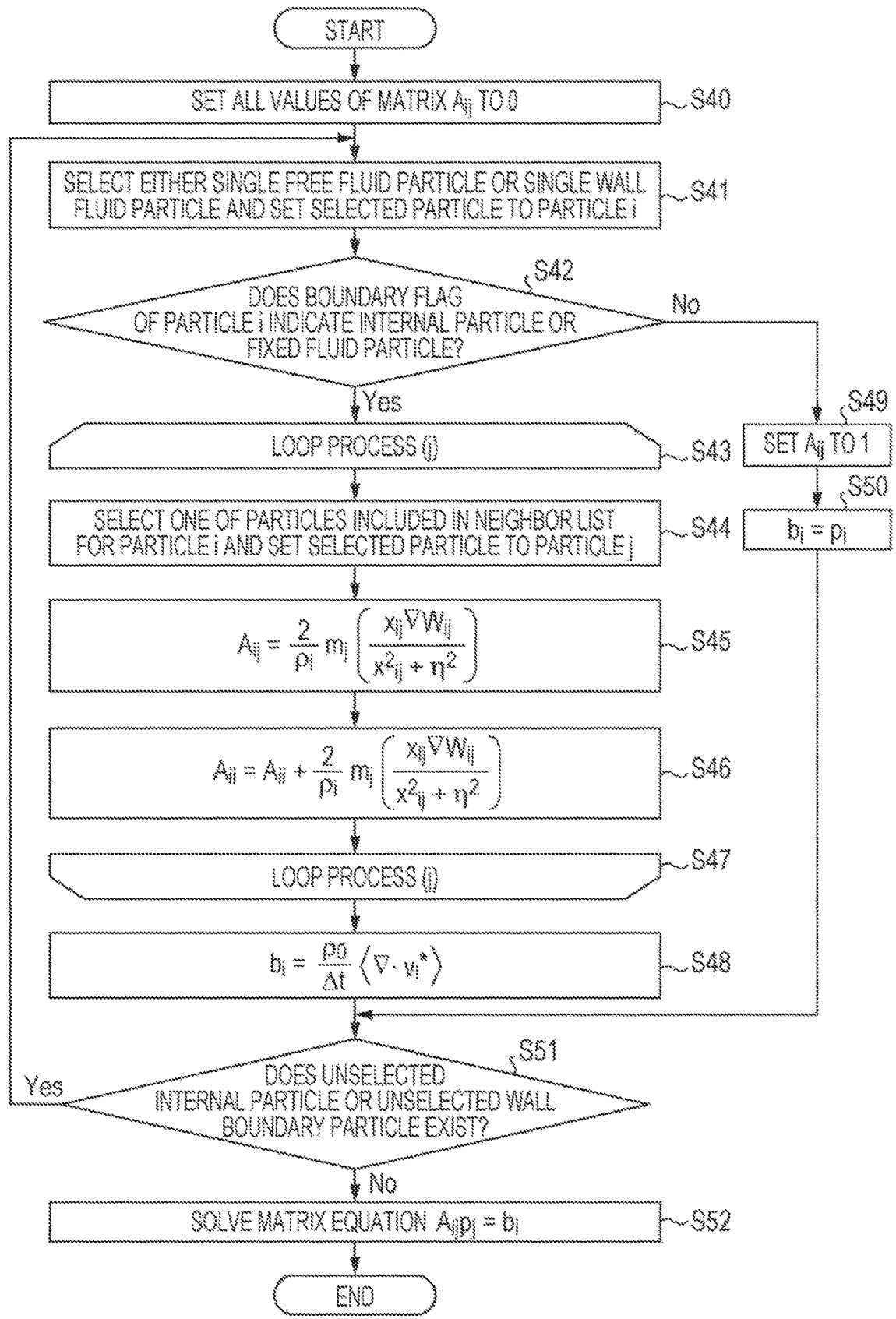
FIG. 9 is a flowchart exemplifying a solving process.

FIG. 9 is a flowchart exemplifying the solving process. As illustrated in FIG. 9, when the process is started, the calculator 13 sets all values of a coefficient matrix $A_{ij}$ to 0 or initializes all elements of the coefficient matrix $A_{ij}$ to 0 (in S40).

The calculator 13 selects either a single free fluid particle or a single wall boundary particle and sets the selected particle to a particle i (in S41). Next, the calculator 13 determines whether or not a boundary flag 114 or 213 of the particle i indicates an internal particle 41 or a fixed fluid particle 51 (in S42).

When the boundary flag 114 or 213 does not indicate the internal particle 41 or the fixed fluid particle 51 (NO in S42), the calculator 13 sets an element of the coefficient matrix $A_{ij}$ to 1 (in S49). The calculator 13 sets a value of an element of a right side vector $b_i$ to pressure $p_i$ (pressure 111 or pressure 212) to be applied to the particle i (in S50) and causes the process to proceed to S51.

When the boundary flag 114 or 213 indicates the internal particle 41 or the fixed fluid particle 51 (YES in S42), the calculator 13 executes the loop process (j) on each of particles indicated in a neighborhood list 30 of the particle i (in S43 to S47). When the loop process (j) is started, the calculator 13 selects one of particles included in the neighborhood list 30 of the particle i and sets the selected particle to a particle j (in S44).

The calculator 13 calculates a value for an element of the coefficient matrix $A_{ij}$ according to the upper term of the right side of Equation (9) (in S45). In this case, the calculator 13 uses positional coordinates 101 or 201 of the particle, a density 103 or 202 of the particle, and a mass 104 or 203 of the particle. The calculator 13 adds the value calculated in S45 to the element of the coefficient matrix $A_{ij}$ (in S46).

When an unselected particle exists among neighboring particles included in a neighborhood list 30 of the particle i, the calculator 13 sets the particle to a particle j and repeats the loop process (j).

The calculator 13 uses Equation (10) to calculate a value of the right side vector $b_i$ (in S48). In this case, velocity divergence 113 or 211 of each of the particles is used.

The calculator 13 determines whether or not an unselected internal particle 41 or an unselected fixed fluid particle 51 exists (in S51). When the unselected internal particle 41 or the unselected fixed fluid particle 51 exists (YES in S51), the calculator 13 causes the process to return to S41 to select a new particle i.

When the unselected internal particle 41 and the unselected fixed fluid particle 51 do not exist (NO in S51), the calculator 13 sets, to p, the coefficient matrix $A_{ij}$ obtained in the aforementioned processes, the right side vector $b_i$ obtained in the aforementioned processes, and pressure 111 or 212 of each of the particles and solves a matrix equation (in S52). Specifically, the calculator 13 calculates the pressure by solving the matrix equation $A_{ij}p_j=b_i$. For example, in the solving, a solving method such as a conjugate gradient method is used.

Returning to FIG. 4, the calculator 13 calculates acceleration (velocities) caused by pressure gradients for each of the particles based on the results of the calculation by the solving process of S8 (in S9). Specifically, the calculator 13 calculates pressure to be applied to each of the wall internal particles after calculating pressure $p_i$ to be applied to each of the free fluid particles in S8.

To calculate the pressure to be applied to each of the wall internal particles, the calculator 13 uses the following Equations (14) and (15) to calculate virtual marker acceleration 313 and virtual marker pressure 314.

$$p_i^{VM} = \sum_j \frac{m_j}{\rho_{0j}} p_j W_{ij} \bigg/ \sum_j \frac{m_j}{\rho_{0j}} W_{ij} \quad (14)$$

$$a_i^{VM} = \sum_j \frac{m_j}{\rho_{0j}} a_j W_{ij} \bigg/ \sum_j \frac{m_j}{\rho_{0j}} W_{ij} \quad (15)$$

The calculator 13 uses values calculated using Equations (14) and (15) to calculate pressure $p_i^{wall}$ to be applied to each of the wall internal particles according to the following Equation (16).

$$p_i^{wall}=p_i^{VM}+2d\rho_0 a^{VM} \cdot n \quad (16)$$

The calculator 13 uses Equation (3) to calculate pressure gradients and updates acceleration and velocities of the particles based on the pressure gradients. It is assumed that a range of the summation of Equation (3) corresponds to a range of neighboring particles of the free fluid particles and wall internal particles (in S9).

The calculator 13 integrates the velocities and the acceleration over time, updates the positions of the particles, and advances time by 1 step (in S10). Specifically, the calculator 13 calculates movement distances of the particles by multiplying the calculated velocities by time corresponding to one time step and updates the positions (positional coordinates 101) of the particles, thereby completing the calculation for one time step.

The output section 14 outputs the results of the calculation as the sequential result information 22 in the form of a file (in S11). The fluid simulation device 1 repeats the loop process of S2 to S12, thereby acquiring simulation results for each of the time steps corresponding to the time intervals of the calculation parameters from the start to end of the simulation.

As described above, the fluid simulation device 1 includes the particle classifying section 12 and the calculator 13. The particle classifying section 12 extracts, based on positional information included in particle data of the particles for each of the time steps, particles with a predetermined distance value or less from the free fluid particles 40 as fixed fluid particles 51 from the wall boundary particles 50. In addition, the particle classifying section 12 extracts, as pressure boundary particles 52, particles with the predetermined distance value or less from the fixed fluid particles 51. The calculator 13 sets the boundary condition of the pressure Poisson equation for calculating pressure to be applied to each of the particles based on the extracted fixed fluid particles 51 and the extracted pressure boundary particles 52 and calculates pressure to be applied to each of the particles. The calculator 13 calculates particle data of each of the particles for the next time step based on the calculated pressure. Since the boundary condition of the pressure Poisson equation for calculating the pressure to be applied to each of the particles is set based on the fixed fluid particles 51 and pressure boundary particles 52 extracted from the wall boundary particles 50, the fluid simulation device 1 may set an appropriate boundary condition even when the fluid flows into a thin gap. Thus, the fluid simulation device 1 may secure convergence of a solution in a particle method.

Figure 10A:
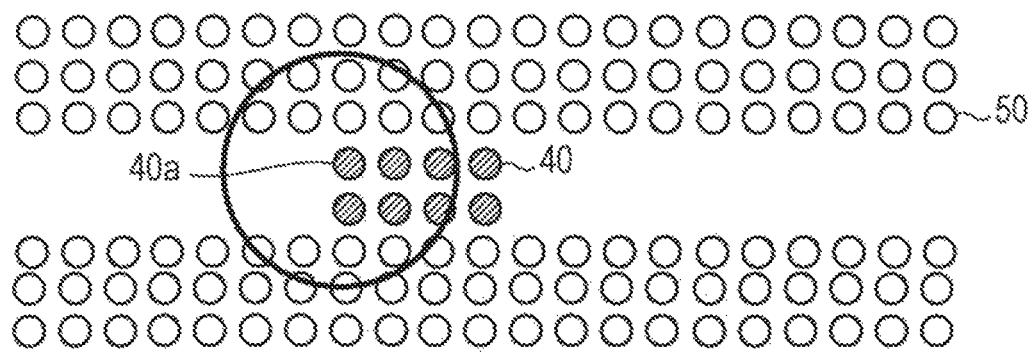
FIG. 10A is an explanatory diagram describing the case where a solution is diverged.
Figure 10B:
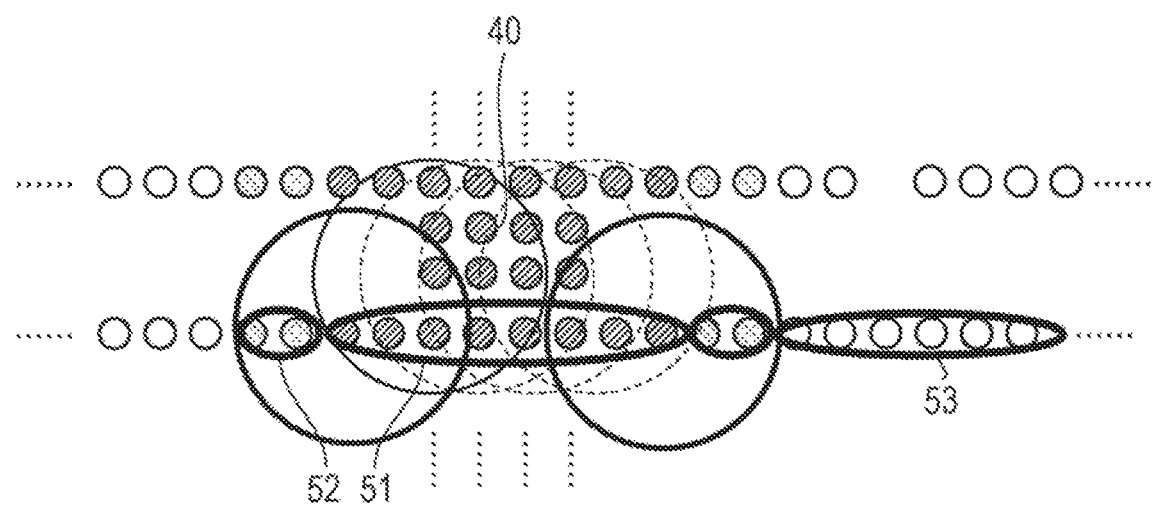
FIG. 10B is an explanatory diagram describing a modified example of a boundary condition.

Securing the convergence of the solution in the particle method by setting an appropriate boundary condition and improving the boundary condition is described, compared with the case where the solution is diverged. FIG. 10A is an explanatory diagram describing the case where the solution is diverged. FIG. 10B is an explanatory diagram describing a modified example of the boundary condition.

As illustrated in FIG. 10A, in the case where the wall boundary particles 50 are uniformly set, free fluid particles 40 flow into a thin gap and many particles surround a particle 40a and are determined as internal particles. In this case, a particle to which the boundary condition is imposed upon the solving of the pressure Poisson equation does not exist among wall boundary particles 50 neighboring the particle 40a, the boundary condition may not be set and the solution may be diverged by solving the pressure Poisson equation.

On the other hand, in the embodiment, particles with the predetermined distance value or less from the free fluid particles 40 are extracted as free fluid particles 51 from the wall boundary particles 50, and particles with the predetermined distance value or less from the fixed fluid particles 51 are extracted as pressure boundary particles 52 from the wall boundary particles 50. The boundary condition of the pressure Poisson equation for calculating pressure to be applied to each of the particles is set based on the fixed fluid particles 51 and pressure boundary particles 52 extracted from the wall boundary particles 50.

For example, the fluid simulation device 1 sets the boundary condition of the pressure Poisson equation so that the fixed fluid particles 51 are set to fluid particles whose velocities are fixed and pressure to be applied to each of the pressure boundary particles 52 is 0 in the boundary condition. In this manner, the fluid simulation device 1 causes the fixed fluid particles 51 neighboring the fluid to be included in the degrees of freedom upon the solving of the pressure Poisson equation and sets the boundary condition of the pressure Poisson equation so that the pressure boundary particles 52 neighboring the fixed fluid particles 51 are set to surface particles to which pressure is set to 0. Thus, the fluid simulation device 1 may execute the calculation even when the fluid flows into a thin gap.

Specifically, as illustrated in FIG. 10B, wall boundary particles 50 neighboring free fluid particles 40 are treated as fixed fluid particles 51 whose velocities are fixed, and the wall boundary particles 50 are included in the degrees of freedom of the pressure Poisson equation, for example. In addition, the boundary condition of the pressure Poisson equation is set so that wall boundary particles 50 that are not close to the fluid and are close to fixed fluid particles 51 are set to pressure boundary particles (surface particles) 52 and pressure to be applied to each of the pressure boundary particles 52 is 0 in the boundary condition. Note that wall boundary particles 50 that are close to the fluid but and are not close to the fixed fluid particles 51 are treated as unused particles 53 and are not used upon the calculation of the pressure Poisson Equation. By setting the boundary condition of the pressure Poisson equation for calculating pressure to be applied to each of the particles based on the fixed fluid particles 51 and the pressure boundary particles 52, the convergence of the solution may be secured even when a free fluid particle 40 flowing in a thin gap exists.

The constituent elements of the devices illustrated in the drawings may not be physically configured as illustrated in the drawings. Specifically, specific forms of the distribution and integration of the devices are not limited to those illustrated in the drawings, and all or a portion of the devices may be functionally or physically distributed and integrated in arbitrary units based on various loads, usage states, and the like.

In addition, all or a portion of the various processing functions to be executed by the fluid simulation device 1 may be executed by a CPU (or microcomputer such as an MPU or a microcontroller unit (MCU)) or the like. In addition, it goes without saying that all or a portion of the various processing functions may be executed by a program analyzed and executed by the CPU (or the microcomputer such as the MPU or the MCU) or the like or by hardware by wired logic. In addition, the various processing functions to be executed by the fluid simulation device 1 may be executed by causing a plurality of computers to collaborate with each other via cloud computing.

Figure 11:
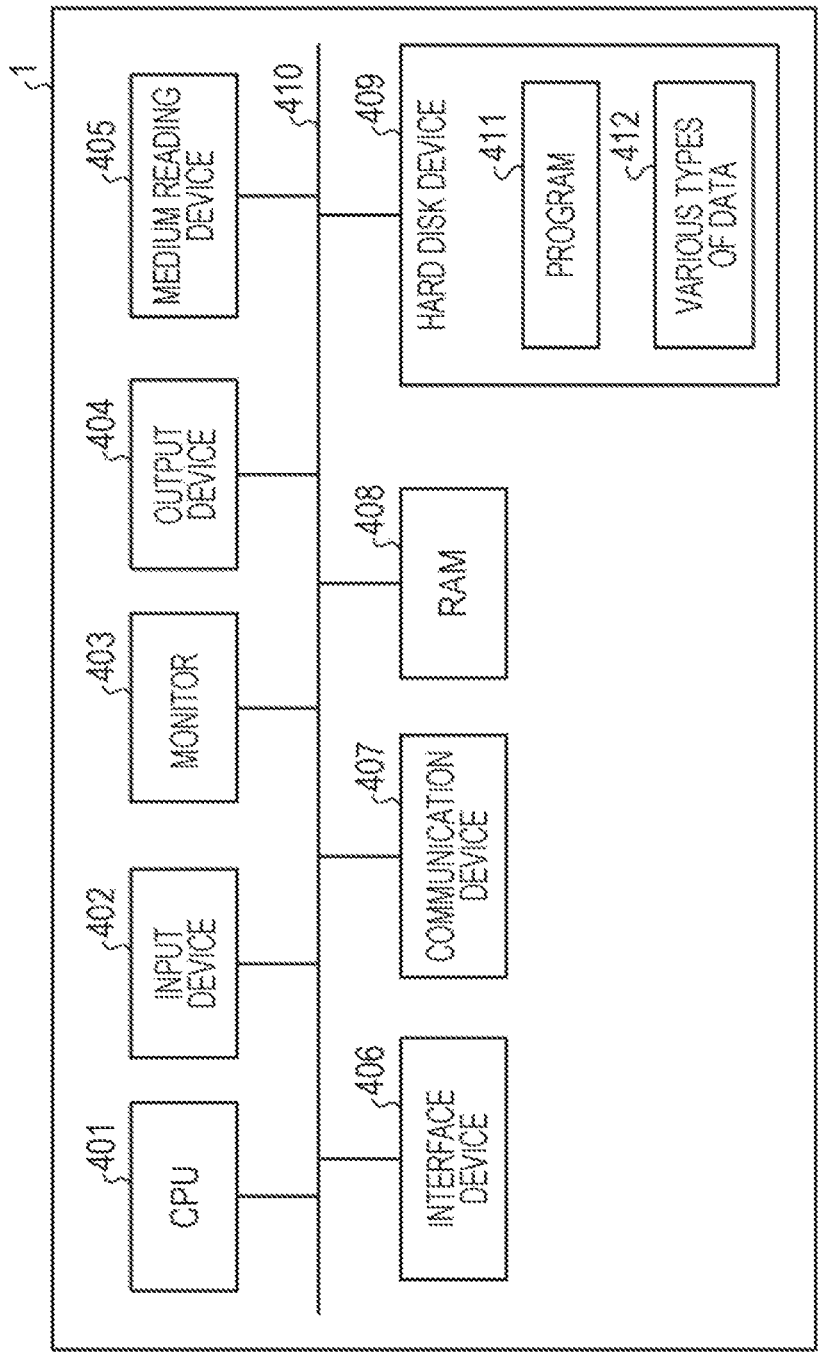
FIG. 11 is a block diagram illustrating an example of a hardware configuration of the fluid simulation device.

The various processes described in the embodiment may be achieved by causing a computer to execute a program prepared in advance. An example of the computer (hardware) configured to execute the program having the same functions as those described in the embodiment is described below. FIG. 11 is a block diagram illustrating an example of a hardware configuration of the fluid simulation device 1 according to the embodiment.

As illustrated in FIG. 11, the fluid simulation device 1 includes a CPU 401 configured to execute the various computation processes, an input device 402 configured to receive the input data, a monitor 403, and an output device 404 such as an audio output device. The fluid simulation device 1 also includes a medium reading device 405 configured to read a program from a storage medium, an interface device 406 to be connected to various devices, and a communication device 407 to be connected to and configured to communicate with an external device via a cable or wirelessly. The fluid simulation device 1 also includes a RAM 408 configured to temporarily store various types of information, and a hard disk device 409. The units (401 to 409) included in the fluid simulation device 1 are connected to a bus 410.

In the hard disk device 409, a program 411 that causes the simulation receiver 11, the particle classifying section 12, the calculator 13, and the output section 14 that are described in the embodiment to execute the various processes is stored. In addition, in the hard disk device 409, various types of data 412 (for example, the particle information 21, the sequential result information 22, and the like) that is referenced by the program 411 is stored. The input device 402 receives operation information input by an operator of the fluid simulation device 1. The monitor 403 displays various screens to be operated by the operator. A printing device or the like may be connected to the interface device 406, for example. The communication device 407 is connected to a communication network such as a local area network (LAN) and communicates various types of information with an external device via the communication network.

The CPU 401 reads the program 411 stored in the hard disk device 409, loads the read program 411 into the RAM 408, executes the loaded program 411, and executes the various processes related to the simulation receiver 11, the particle classifying section 12, the calculator 13, and the output section 14. The program 411 may not be stored in the hard disk device 409. For example, the CPU 401 may read and execute the program 411 stored in a storage medium readable by the fluid simulation device 1. The storage medium readable by the fluid simulation device 1 corresponds to a portable recording medium such as a CD-ROM, a DVD, or a Universal Serial Bus (USB) memory, a semiconductor memory such as a flash memory, a hard disk drive, or the like, for example. In addition, the program 411 may be stored in a device connected to a public line, the Internet, a LAN, or the like, and the fluid simulation device 1 may read the program 411 from the device and execute the read program 411.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a fluid simulating program for causing a computer to execute a process, the process comprising:

extracting, based on positional information included in particle data of particles, including fluid particles and wall boundary particles related to a boundary with a wall, during a predetermined time period, a first particle from among the wall boundary particles with a predetermined value or less of distance from a fluid particle among the fluid particles and a second particle with the predetermined value or less of distance from the first particle from among the wall boundary particles excepting the first particle;

setting a boundary condition of a pressure Poisson equation for calculating pressure to be applied to each of the particles;

calculating the pressure to be applied to each of the particles, based on the first particle and the second particle; and calculating the particle data of the particles during a next time period based on the pressure, the boundary condition includes that the first particle is set to a fixed fluid particle whose velocity is a predetermined value and that pressure to be applied to the second particle is 0.

2. A fluid simulating method performed by a computer, the method comprising:

extracting, based on positional information included in particle data of particles, including fluid particles and wall boundary particles related to a boundary with a wall, during a predetermined time period, a first particle from among the wall boundary particles with a predetermined value or less of distance from a fluid particle among the fluid particles and a second particle with the predetermined value or less of distance from the first particle from among the wall boundary particles excepting the first particle;

setting a boundary condition of a pressure Poisson equation for calculating pressure to be applied to each of the particles;

calculating the pressure to be applied to each of the particles, based on the first particle and the second particle; and calculating the particle data of the particles during a next time period based on the pressure, the boundary condition includes that the first particle is set to a fluid particle whose velocity is a predetermined value and that pressure to be applied to the second particle is 0.

3. A fluid simulating apparatus comprising:

a memory, and a processor coupled to the memory and configured to perform a process including:

extracting, based on positional information included in particle data of particles, including fluid particles and wall boundary particles related to a boundary with a wall, during a predetermined time period, a first particle from among the wall boundary particles with a predetermined value or less of distance from a fluid particle among the fluid particles and a second particle with the predetermined value or less of distance from the first particle from among the wall boundary particles excepting the first particle;

setting a boundary condition of a pressure Poisson equation for calculating pressure to be applied to each of the particles;

calculating the pressure to be applied to each of the particles, based on the first particle and the second particle; and calculating the particle data of the particles during a next time period based on the pressure, the boundary condition includes that the first particle is set to a fluid particle whose velocity is a predetermined value and that pressure to be applied to the second particle is 0.

4. A fluid simulating apparatus comprising:

a memory storing instructions;

a processor coupled to the memory and configured to execute the instructions to perform a process of:

detecting a plurality of particles including fluid particles and wall boundary particles related to a boundary with a wall in a fluid;

determining that one or more first particles of the plurality of particles are free fluid particles;

classifying one or more second particles of the free fluid particles as surface particles from which a neighboring particle is at a distance greater than an influence radius in at least one direction, and one or more third particles of the free fluid particles as internal particles which have neighboring particles at a distance equal to or less than the influence radius in all directions;

setting a boundary condition of a pressure Poisson equation to be applied to each of the plurality of particles based on the determining and the classifying so that a convergence of a solution is obtained when each of the free fluid particles flows in a gap of the fluid;

calculating pressure to be applied to each of the plurality of particles, based on the one or more first particles and the one or more second particles; and calculating particle data of the one or more particles during a predetermined time period based on the pressure.

5. The fluid simulating apparatus of claim 4, wherein the neighboring particle is treated as a fixed particle.

6. The fluid simulating apparatus of claim 4, wherein the one or more second particles have fixed velocities.

* * * * *